(12) United States Patent
Preuss et al.

(10) Patent No.: US 12,556,281 B2
(45) Date of Patent: Feb. 17, 2026

(54) PLUGGABLE OPTICAL TRANSCEIVER MODULE

(71) Applicant: Nokia Solutions and Networks OY, Espoo (FI)

(72) Inventors: Marc Preuss, Ottawa (CA); William dos Santos Fegadolli, Azusa, CA (US)

(73) Assignee: Nokia Solutions and Networks OY, Espoo (FI)

( * ) Notice: Subject to any disclaimer, the term of this patent is extended or adjusted under 35 U.S.C. 154(b) by 353 days.

(21) Appl. No.: 18/205,269

(22) Filed: Jun. 2, 2023

(65) Prior Publication Data

US 2024/0405878 A1 Dec. 5, 2024

(51) Int. Cl.
*H04B 10/00* (2013.01)
*H04B 10/25* (2013.01)
*H04B 10/43* (2013.01)
*H04B 10/80* (2013.01)
*H04J 14/00* (2006.01)

(52) U.S. Cl.
CPC ......... *H04B 10/43* (2013.01); *H04B 10/2589* (2020.05); *H04B 10/801* (2013.01)

(58) Field of Classification Search
CPC ..................................................... H04B 10/40
See application file for complete search history.

(56) References Cited

U.S. PATENT DOCUMENTS

| 11,383,426 | B2 | 7/2022 | Chung et al. | |
|---|---|---|---|---|
| 2019/0245751 | A1* | 8/2019 | Wong | H04L 45/122 |
| 2021/0119835 | A1 | 4/2021 | Levin et al. | |
| 2021/0263247 | A1* | 8/2021 | Bechtolsheim | G02B 6/4284 |

OTHER PUBLICATIONS

IET Optoelectronics "Co-packaged datacenter optics: Opportunities and challenges" Minkenberg et al. Accepted Sep. 16, 2020.
Optical interconnects in enterprise and hyperscale datacenters. SProc. of PIE vol. 11286, 1128602-1, 2020.
24177015.5-1206 European Search Report Nov. 11, 2024.
XS2006100103CF Aug. 2024.

* cited by examiner

*Primary Examiner* — Daniel G Dobson
(74) *Attorney, Agent, or Firm* — Stratford Group Ltd.

(57) ABSTRACT

A QSFP-DD optical transceiver module having more than four optical data ports and more than four electrical data ports is configured for approximately 10 Gb/s bidirectional data communication on each of the data ports, and is further configured to communicatively inter-connect each of the optical data ports thereof to a corresponding one of the electrical data ports thereof. The module may be used with a digital data router or switch having at least one QSFP-DD receptacle with eight electrical data ports and configured for parallel bidirectional communication with the QSFP-DD module plugged therein over at least five of the eight electrical data ports at 10 Gb/s per port and direction.

16 Claims, 3 Drawing Sheets

PLUGGABLE OPTICAL TRANSCEIVER MODULE

TECHNICAL FIELD

The present invention relates to pluggable optical transceiver modules for broad-band optical communications and data centers.

BACKGROUND

Data routers in broad-band telecom networks and data centers typically use pluggable optical transceiver modules to convert between electrical signals (e.g. host-side) and optical signals (e.g. line-side or client-side). The optical signals are transmitted via fiber optic cables to interconnect with other routers or switches. Pluggable optical transceiver modules may have different form factors, which are typically governed by corresponding Multi Source Agreements (MSA) between various equipment manufacturers and system providers. In response to the market requirements of ever increasing bandwidth, each next generation of such modules has been developed to support a greater data rate per port. Examples of such modules include SFP (Small Form-factor Pluggable) and QSFP (Quad Small Form-factor Pluggable) modules, each of which with several modifications evolved to use ever increasing data rates. E.g. the QSFP standard has evolved from an aggregate port speed of 40 Giga-bit-per-second (Gb/s) to 400 Gb/s over the years. The host-side interface of various QSFP flavors supports 4 (four) electrical lanes running at 4×10 G (QSFP+), 4×25 G (QSFP28), 4×50 G (QSFP56), or 4×100 G (QSFP112). Here "G" stands for a data rate of approximately 1 Gb/s, in accordance with a common convention. The electrical lanes at the host-side interface can be aggregated into large Ethernet optical ports, e.g. a QSFP28 module can aggregate 4×25 G electrical signals into a 100 GbE (Gigabit Ethernet) optical port, or can be unaggregated ("break out") and connected to individual optical transmitters/receivers, e.g. 4×25 G electrical signals into 4×25 GbE independent optical ports.

The QSFP-DD (i.e. QSFP Double-Density) optical transceiver modules have been developed to double the number of electrical lanes to 8 (eight), with the aggregated port data rates 8×25 G ("QSFP28-DD", or "QSFP-DD200"), 8×50 G ("QSFP56-DD", or "QSFP-DD400"), and 8×100 G ("QSFP112-DD", or "QSFP-DD800"). The QSFP-DD cage (i.e. the host-side receptacle for the pluggable module) was designed for backwards compatibility with 4-lane QSFP modules.

SUMMARY

An example embodiment described herein provides an apparatus comprising a Quad Small Form-Factor Pluggable Double Density (QSFP-DD) optical transceiver module having more than 4 bidirectional optical data ports and more than 4 bidirectional electrical data ports. The QSFP-DD optical transceiver module is configured for approximately 10 Giga-bit-per-second (Gb/s) bidirectional data communication on each of the data ports. The QSFP-DD optical transceiver module is further configured to communicatively inter-connect each optical data port thereof to a corresponding one of the electrical data ports thereof.

A related example described herein provides an apparatus comprising a digital data router or switch. The digital data router or switch comprises a plurality of receptacles for Quad Small Form-Factor Pluggable Double Density (QSFP-DD) optical transceiver modules. Each one of the receptacles has eight electrical data ports, at least five of the eight electrical data ports being configured for simultaneous bidirectional data communication, at a rate of approximately 10 Giga-bit-per-second (Gb/s) for each port, between the digital data router or switch and a QSFP-DD module plugged into the one of the receptacles.

BRIEF DESCRIPTION OF THE DRAWINGS

Embodiments disclosed herein will be described in greater detail with reference to the accompanying drawings which represent preferred embodiments thereof, in which like elements are indicated with like reference numerals, and wherein.

DETAILED DESCRIPTION OF SOME SPECIFIC EMBODIMENTS

Figure 1:
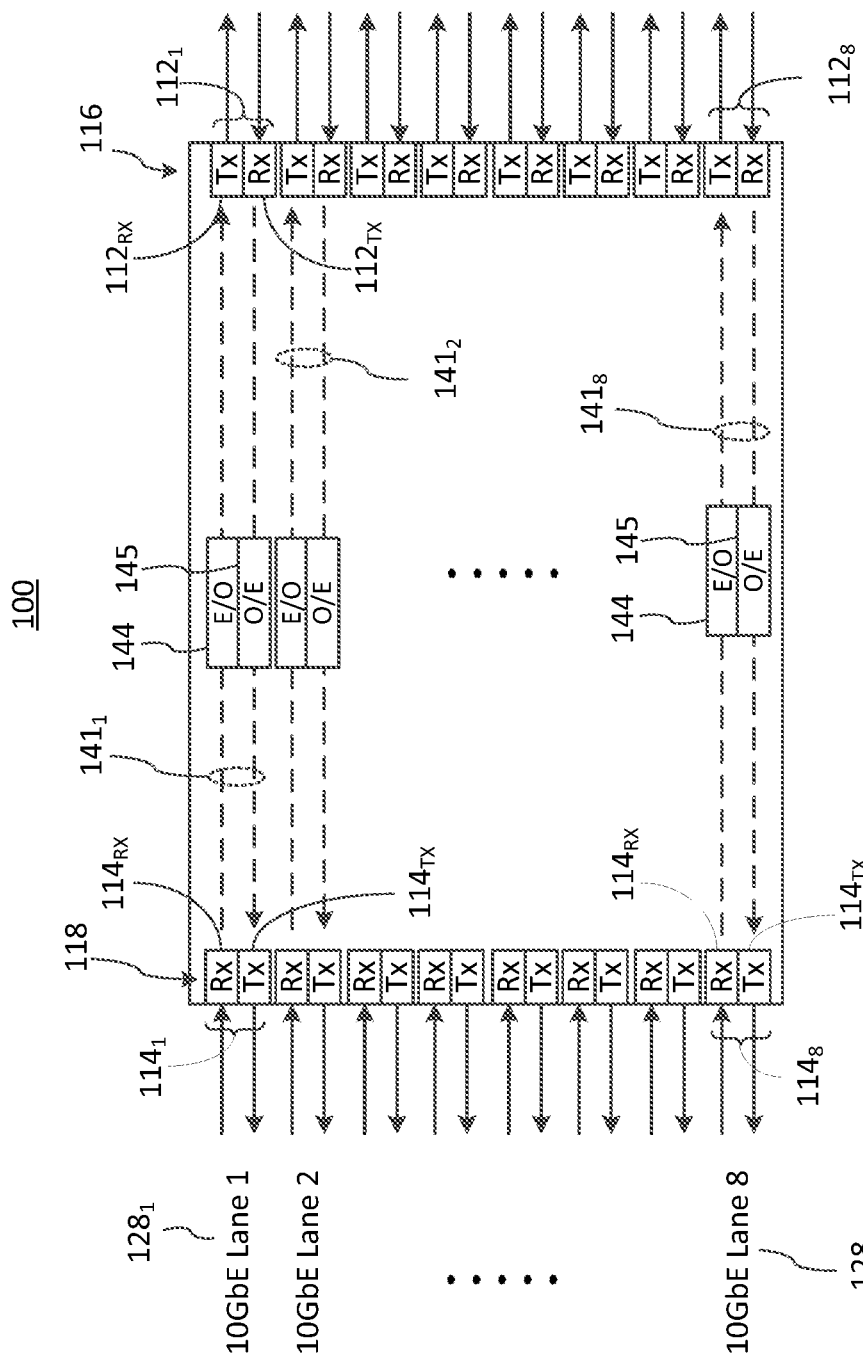
FIG. 1 is a schematic diagram illustrating a QSFP-DD optical transceiver module configured for 8×10 G break-out.

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits may be omitted so as not to obscure the description of the present invention. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Note that as used herein, the terms "first", "second" and so forth are not intended to imply sequential ordering, but rather are intended to distinguish one element from another, unless explicitly stated. Similarly, sequential ordering of method steps does not imply a requirement of sequential order of their execution, unless explicitly stated.

The following abbreviations and acronyms may be used in the present document:
ADC: Analog to Digital Converter
DAC: Digital to Analog Converter
QSFP: Quad Small Form-Factor Pluggable
QSFP-DD: QSFP Double-Density
MSA: Multi Source Agreement
MPO: Multi-Fiber Push On
MLG: Multi-link Gearbox
GbE: Gigabit Ethernet
PHY: Physical Layer
PAM4: Pulse Amplitude Modulation, 4 level
ASIC: Application-Specific Integrated Circuit
TIA: Transimpedance Amplifier Designers of broad-band telecom systems and data centers may source pluggable optical transvers modules from different manufacturers. In order to ensure interoperability, such modules are typically governed by MSAs that define requirements to form-factors and electrical, optical, mechanical, and control interfaces of such modules. In response to the market demands of ever increasing bandwidth, each next generation of such modules has been developed to support a greater data rate per port. E.g. the QSFP family of modules, having four electrical lines, have evolved over the years from supporting a data rate of approximately 10-40 Gb/s per port (QSFP+ modules), to 25-100 Gb/s per port (QSFP28 modules), with even greater rates possible with PAM4 modulation formats. To meet the market need for modules with high aggregated data rates of 400 G and 800 G, QSFP-DD (i.e. QSFP Double-Density) optical transceiver modules have been developed to double the number of electrical lanes to 8 (eight), with data rate per electrical lane or port of 25 G, 50 G, or 100 G, and the aggregated port rate of 200 G, 400 G, or 800 G (QSFP-DD800).

However, client-side data channels still frequently operate at data rates of about 10 Gb/s (due to the ubiquity of 10 G SFP+), and digital data routers or switches having an ability to aggregate a large number of such channels in a relatively small footprint are desired. One existing solution is a QSFP28 optical transceiver module that has a 4-lane, 25 G per lane host-side electrical interface and 10 independent 10 GbE client-side optical ports. This optical transceiver module relies on an MLG (Multi-link Gearbox) protocol to convert between the 10 GbE optical signals and a 100 G (i.e. 4×25 G) electrical channel, and requires an MLG gearbox device inside the optical transceiver module, which adds to power supply requirements, cost, and complexity of the module. It also requires the host router's Physical Layer (PHY) device to have MLG functionality, which is not widely supported by typical Ethernet PHY/devices currently on the market.

The present disclosure describes examples of a QSFP-DD optical transceiver module configured for N×10 G breakout, where N is greater than 4, e.g. 5, 6, 7, or 8; this allows increasing, e.g., the 10 GbE "break out" port density on routers and switches without the drawbacks of a 10×10 GbE MLG solution.

FIG. 1 schematically illustrates an example QFSP-DD optical transceiver module 100 ("module100") having an optical interface 116 including more than four, e.g., eight, bidirectional optical data ports $112_1, \ldots, 112_8$, commonly referred to as optical data ports 112. An electrical (host-side) interface 118 of the QFSP-DD optical transceiver module 100 typically includes eight bidirectional electrical data ports $114_1, \ldots, 114_8$, commonly referred to as electrical data ports 114. The QSFP-DD optical transceiver module 100 is configured for approximately 10 Giga-bit-per-second (Gb/s) bidirectional data communication on each of the electrical data ports 114 and each of the optical data ports 112.

Here, "approximately 10 Gb/s" means that the actual bit rate of data signals transmitted through the port may slightly differ from 10 Gb/s, typically within +\−1 Gb/s, or possibly up to +\−2 Gb/s, e.g. due to a coding overhead or circuit tolerances. For example, the QSFP-DD optical transceiver module 100 may be configured to support up to 8 independent 10 Gigabit Ethernet (GbE) channels between the optical and electrical interfaces thereof. The nominal transmission bit rate ("line rate" in this example may be about 10.3125 Gb/s ("10 GBASE-R" line rate) due to a 64/66 PCS (Physical Coding Sublayer) encoding. In another example, the line rate supported by the QSFP-DD optical transceiver module 100 may be 9.95328 Gb/s ("10 GBASE-W"); other line rates may be used for near-10 G communications employing e.g. Fibre Channel, InfiniBand, or SONET/SDH communication formats. In the following "approximately 10 Gb/s" may be abbreviated as "10 Gb/s", which is to be understood as including the word "approximately".

Figure 2:
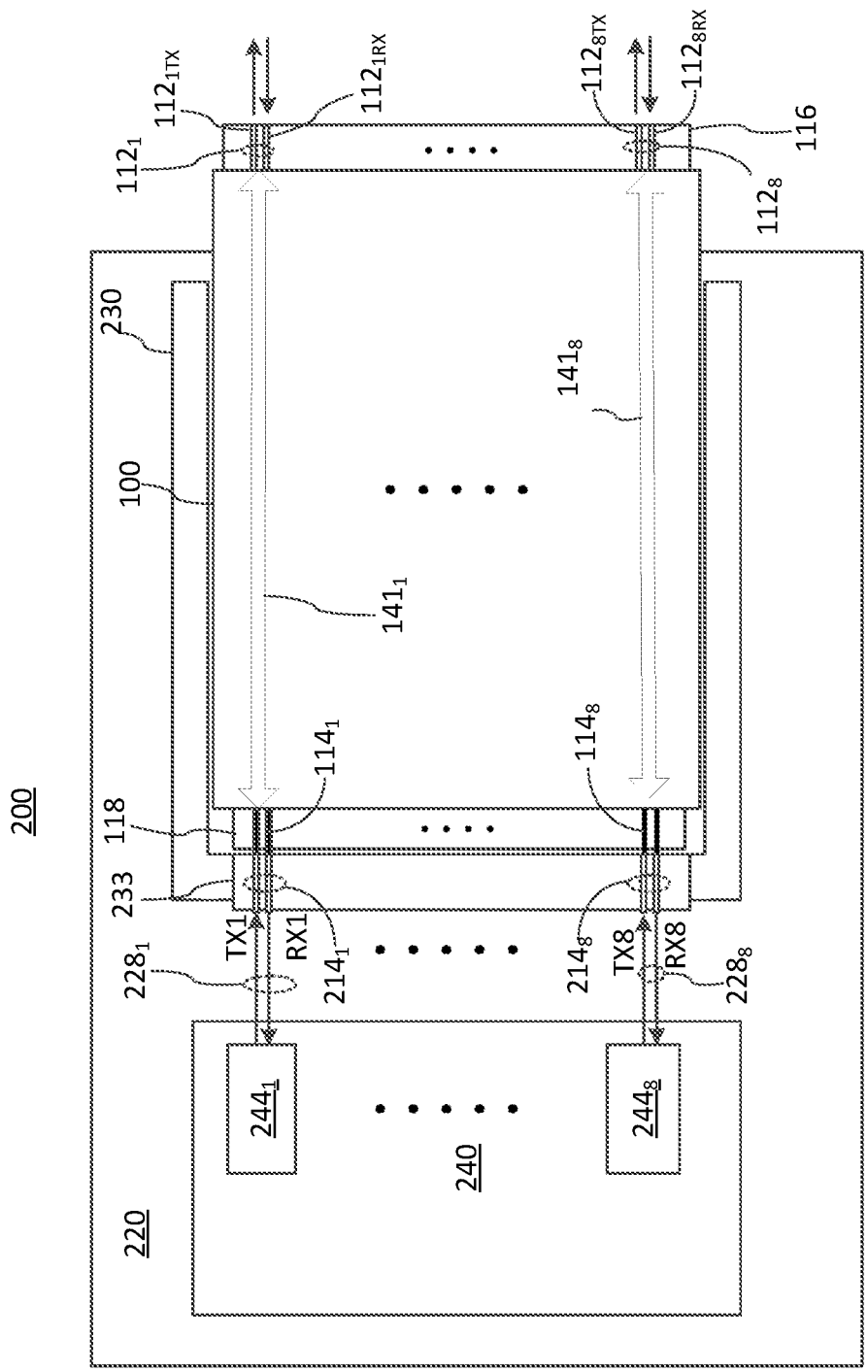
FIG. 2 is a schematic diagram illustrating a host device configured to communicate with QSFP-DD optical transceiver modules of the type shown in FIG. 1.

In the example illustrated in FIG. 1, the eight electrical data ports $114_1, \ldots, 114_8$ are duplex ports configured to connect to corresponding duplex bidirectional electrical 10 G lanes $128_1, \ldots, 128_8$ ("OG lanes 128") of a host device, e.g. a data router or switch, via signal-receiving (Rx) and signal-transmitting (Tx) electrical connectors $114_{Rx}, 114_{Tx}$. Each of the 10 G lanes 128 may be a duplex electrical lane where the Rx and Tx signals propagate along different electrical lines. Each of the bidirectional optical data ports 112 is, in the shown example, a duplex port including a Tx optical connector $112_{TX}$ and an Rx optical connector $112_{RX}$, for connecting to corresponding optical fibers of a full-duplex optical communication link (not shown) with different fibers for Tx and Rx optical signals. The Rx and Tx connectors $114_{RX}$ and $114_{TX}$ of a same bidirectional, full-duplex in the shown example, electrical data port 114 may or may not be located side by side as schematically illustrated in FIGS. 1 and 2; for example, in some embodiments all of the electrical Rx connectors $114_{RX}$ may be grouped at one side of the electrical interface 118, and all of the electrical Tx connectors $114_{TX}$ may be grouped at another side of the electrical interface 118. Similarly, the optical Rx and Tx connectors $112_{RX}$ and $112_{TX}$ of a same full-duplex optical data port 112 may or may not be located side by side as schematically illustrated in FIGS. 1 and 2; for example, in some implementations all of the optical Rx connectors $112_{RX}$ (e.g. ferrules) may be grouped at one side of the optical interface 116, and all of the optical Tx connectors $112_{TX}$ (e.g. ferrules) may be grouped at another side of the optical interface 116.

In other implementations, at least some of the optical data ports 112 may each use a single optical connector, commonly referred to as "BiDi", to receive and transmit optical signals from a same optical fiber. Similarly, in some implementations, at least some of the electrical data ports 114 may each be a "BiDi" electrical port configured to receive and transmit electrical signals from a same "BiDi" electrical lane 128.

The QSFP-DD optical transceiver module 100 is configured to communicatively pair-wise inter-connect, or "map", each one of the optical data ports 112 thereof to a corresponding one of the electrical data ports 114, at a data rate of approximately 10 Gb/s for each of the port-to-port connections. In the illustrated example, the QSFP-DD optical transceiver module 100 is configured to pair-wise connect eight optical data ports 112 to corresponding ones of the electrical data ports 114 at approximately 10 Gb/s data rate per connection, to provide eight full-duplex 10 GB/s data paths $141_1, \ldots, 141_8$ ("data paths 141") between the optical and electrical interfaces 116, 118. Each of the data paths 114 includes a 10 Gb/s electrical-to-optical (E/O) converter 144 in an optical Tx path and a 10 Gb/s optical-to-electrical (O/E) converter 145 in an optical Rx path. The 10 Gb/s E/O converter 144 may include a laser source (not shown) configured to be modulated at approximately 10 Gb/s bit rate, e.g. a semiconductor laser chip incorporating an electro-absorption modulator (EML), and a corresponding laser driver (not shown) configured to generate 10 Gb/s modulation signals. In some embodiments, the driver may include a digital-to-analog converter ("DAC", not shown) to convert a received 10 Gb/s digital signal into an analog electrical signal to drive the laser. The 10 Gb/s O/E converter 145 may include a photodetector (not shown), e.g. a PIN diode, coupled to a transimpedance amplifier (TIA) (not shown), each of which configured to operate on signals at approximately 10 Gb/s bit rate. In some embodiments, the O/E converter may include an analog-to-digital converter ("ADC", not shown) to digitize the output signal of the TIA for transmission at the corresponding electrical Tx connector.

Variations of the QSFP-DD optical transceiver module 100 may include more than four, e.g. 5, 6, 7, or 8 bi-directional, e.g. duplex, optical data ports 112, and an equal number, e.g. 5, 6, 7, or 8, bidirectional, e.g. duplex, electrical data ports 114. The optical (116) and electrical (118) interfaces of the module may be interconnected by more than four, e.g. 5, 6, 7, or 8 separate bidirectional, e.g. duplex, data paths 141, each of which configured for approximately 10 Gb/s line rates.

Typically, the QSFP-DD optical transceiver module 100 does not have re-timing or clock-and-data (CDR) circuitry in any of the 10 G data path 141, although embodiments including such circuitry may also be contemplated.

FIG. 2 illustrates an apparatus 200, such as digital data router or switch, including a host device 220 configured for use with the QSFP-DD optical transceiver module(s) 100. The host device 220 may be, e.g., a card or a circuit board configured to be installed in the apparatus 200. The host device 220 has at least one receptacle 230, which may also be referred to as a cage, configured for receiving the QSFP-DD optical transceiver module 100. The receptacle 230 includes an electrical interface 233 having eight bidirectional electrical data ports $214_1, \ldots, 214_8$ ("electrical data ports 214"), at least five of said electrical data ports 214 being configured for simultaneous bidirectional data communication, at a rate of approximately 10 Giga-bit-per-second (Gb/s) per port, between the host device 220 and a QSFP-DD optical transceiver module plugged into the receptacle 230, e.g. the QSFP-DD optical transceiver module 100. The host device 220 may include a PHY layer device 240, e.g. a digital signal processor (DSP) implemented with an ASIC, that is configured to simultaneously service and/or operate at least five, and typically up to eight, independent 10 Gb/s bidirectional, e.g. duplex, electrical lanes $228_1, \ldots, 228_8$ ("electrical lanes 228"), each connecting to a corresponding 10 Gb/s data path 148 in the QSFP-DD optical transceiver module 100 via the electrical interface 233 of the receptacle 230. The servicing and/or operating the electrical lanes 228 includes operating a corresponding clock recovery circuit 244 independently for each lane 228. The clock recovery circuits 244 may be parts of corresponding electrical data ports 214. Each of the clock recovery circuits 244 may be configured to detect a clock, or reference, frequency for a data signal received from the QSFP-DD optical transceiver module 100 over a corresponding one of the electrical lanes 228, and to sample the received signal at the detected clock frequency. In an example embodiment, each clock recovery circuit 244 includes a phase locked loop (PLL) circuit (not shown) dedicated to locking on a frequency of the electrical data signal received over a corresponding electrical lane 228. This allows each of the 5, 6, 7, or 8 electrical lanes 228 to run on independent clock reference frequencies. By way of example, a 10 GbE signal may have a bit rate within a band of +/−100 ppm (parts per million). Accordingly, a data signal received over one of the electrical data lanes 228, e.g. lane $228_1$, may have a line rate of (10 GbE−100 ppm), while a data signal received over another one of the electrical data lanes 228, e.g. lane $228_8$, may have a line rate of (10 GbE+100 ppm). These clock frequencies corresponding to these two line rates are not identical, therefore a separate PLL circuit may be used for each electrical lane 228, so that each lane 228 of the host device 220 may operate at the line rate of a corresponding one of the electrical ports 114/data path 141 of the QSFP-DD optical transceiver module 100.

Figure 3:
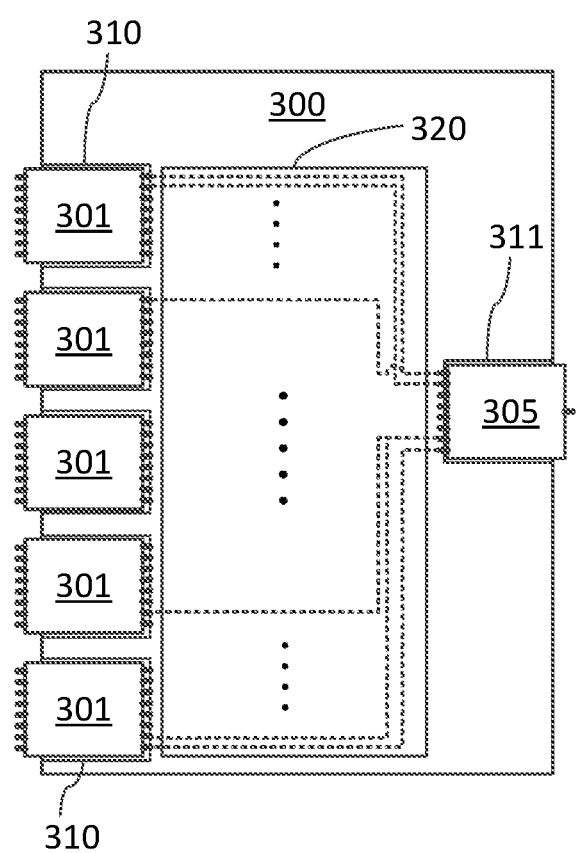
FIG. 3 is a schematic diagram illustrating a digital data router configured to host, and aggregate the data from, a plurality of 10 GbE electrical data ports of one or more QSFP-DD optical transceiver modules of FIG. 1.

FIG. 3 illustrates an example digital data router or switch 300 configured to use one or more QSFP-DD optical transceiver modules as described above to aggregate the data from a plurality of 10 GbE channels thereof into one or more higher data rate channels. The digital data router 300 has a plurality of QSFP-DD receptacles 310, five in the illustrated example, each receptacle 310 having N bi-directional 10 GbE electrical lanes for connecting to N×10 GbE electrical ports of a QSFP-DD optical transceiver module 301 plugged therein. Here N is an integer greater than 4, e.g. 5, 6, 7, or 8. The QSFP-DD optical transceiver module 301 may be an embodiment of the QSFP-DD optical transceiver module 100 described above. The digital data router 300 further includes a QSFP-DD receptacle 311 having M≥1 bidirectional, e.g. duplex, electrical ports, each configured for e.g. N×10 GbE data rate. The digital data router 300 includes a packet processor 320, e.g. an ASIC, configured to aggregate N 10 GbE signal channels into a N×10 GbE channel.

In the example illustrated in FIG. 3, each of QSFP-DD optical transceiver modules 301, and each of the corresponding QSFP-DD receptacles 310, has eight 10 GbE electrical ports (i.e. N=8) to support 40 (forty) 10 GbE data channels with a total aggregated data rate of 400 G. The QSFP-DD optical transceiver modules 305, and the corresponding QSFP-DD receptacle 311, has eight 50 G electrical ports to support a 400 GbE data channel. The packet processor 320 is configured to aggregate the data from forty 10 GbE data channels of the QSFP-DD optical transceiver modules 301 into a 400 GbE data channel of the QSFP-DD optical transceiver module 305.

Advantageously, the examples describe above allow to combine a full support for Synchronous Ethernet with a high 10 GbE port density without the need for an MLG support either at the router or the pluggable optical module.

While the prior-art 10×10 G MLG approach described above can only run the 4×25 G electrical lanes at one frequency, which also defines the reference frequency for each of 10×10 GbE optical ports, the QSFP-DD optical transceiver modules configured for 8×10 GbE breakout, as described above, allow supporting eight independent 10 GbE channels, i.e., 8 separate bidirectional channels without data mixing therebetween, wherein each channel synchronized to a different clock within the allowable range for 10 GbE, both on the optical and electrical interfaces.

Furthermore, by avoiding an MLG gearbox device inside the optical transceiver module and adopting the larger QSFP-DD form factor, there is more room inside the module for optical componentry (i.e. lasers, photodetectors, etc.). Other potential advantages include low power consumption, easier thermal management, and lower module complexity, e.g. simpler circuitry, less firmware and software, greater reliability.

According to an example embodiment disclosed above, e.g., in the summary section and/or in reference to any one or any combination of some or all of FIGS. 1-3, provided is an apparatus (e.g. 100, FIG. 1; 200, FIG. 2; 300, FIG. 3), comprising a Quad Small Form-Factor Pluggable Double Density (QSFP-DD) optical transceiver module (e.g. 100, FIGS. 1,2; 301, FIG. 3) having more than four bidirectional optical data ports (e.g. $112_1$, $112_8$, FIGS. 1, 2) and more than four bidirectional electrical data ports (e.g. $114_1$, $114_8$, FIGS. 1, 2); wherein the QSFP-DD optical transceiver module is configured for approximately 10 giga-bit-per-second (Gb/s) bidirectional data communication on each of the data ports (e.g. 114, 112); and wherein the QSFP-DD optical transceiver module is configured to communicatively inter-connect each optical data port thereof (e.g. $112_1$) to a corresponding one of the electrical data ports (e.g. $114_1$) thereof.

In some embodiments of the above apparatus, the QSFP-DD optical transceiver module (e.g. 100, FIGS. 1, 2; 301, FIG. 3) is configured to inter-connect each of the optical data ports thereof to the corresponding one of the electrical data ports thereof at an approximately 10 Gb/s data rate.

In some embodiments of any of the above apparatus, each of said optical (e.g. 112, FIGS. 1,2) and electrical (e.g. 114, FIGS. 1,2) data ports is full-duplex.

In some embodiments of any of the above apparatus, the QSFP-DD optical transceiver module (e.g. 100, FIGS. 1, 2; 301, FIG. 3) is configured to communicate data between each one of the pairs of corresponding electrical and optical data ports of the module without mixing therein of data from another of the pairs of corresponding electrical and optical data ports of the module.

In some embodiments of any of the above apparatus, the QSFP-DD optical transceiver module (e.g. 100, FIGS. 1, 2; 301, FIG. 3) is absent of CDR circuitry.

Some embodiments of any of the above apparatus (e.g. 200, FIG. 2; 300, FIG. 3) further comprise a digital data router or switch (e.g. 210, FIG. 2; 300, FIG. 3) having a plurality of receptacles (e.g. 230, FIG. 2; 310, FIG. 3) for QSFP-DD modules, the QSFP-DD optical transceiver module (e.g. 100, FIG. 2; 301, FIG. 3) plugged in one of the receptacles having more than four electrical data ports; the digital data router or switch is configured for parallel data communication with the QSFP-DD optical transceiver module over the more than four electrical data ports of the one of the receptacles at a rate of approximately 10 Gb/s per port and direction. In some of such embodiments, the digital data router or switch is configured to provide clock recovery (e.g. $244_1$, $244_8$, FIG. 2) at approximately 10 Gb/s bit rate for data signals received from each of the more than four electrical data ports (e.g. $214_1$, $214_8$, FIG. 2) of the one of the receptacles (e.g. 230, FIG. 2) thereof. In some of such embodiments, the QSFP-DD optical transceiver module comprises more than four separate bidirectional data links (e.g. 141, FIGS. 1 and 2) pair-wise interconnecting the electrical and optical data ports thereof, each of the separate bidirectional data links comprising an electrical-to-optical converter (e.g. 144, FIG. 1) configured for approximately 10 Gb/s operation. In some of such embodiments, each of the separate bidirectional data links may further comprise an optical-to-electrical converter (e.g. 145, FIG. 1) configured for approximately 10 Gb/s operation.

In some embodiments of any of the above apparatus, the QSFP-DD optical transceiver module (e.g. 100, FIGS. 1, 2; 301, FIG. 3) has, at least, six of the optical data ports and at least six of the electrical data ports, each of said at least six of the optical data ports and said at least of the electrical data ports being configured for full-duplex operation at an approximately 10 Gb/s data rate. In some of such embodiments comprising a digital data router or switch (e.g. having a plurality of receptacles for QSFP-DD optical transceiver modules, the QSFP-DD optical transceiver module is plugged in one of the receptacles having at least six electrical data ports; the digital data router or switch is configured for parallel data communication with the QSFP-DD optical transceiver module over the more than six electrical data ports of the one of the receptacles, at a rate of approximately 10 Gb/s per port in each direction.

In some embodiments of any of the above apparatus, the QSFP-DD optical transceiver module has eight of the optical data ports and eight of the electrical data ports, each of said eight of the electrical ports being configured for full-duplex operation at approximately 10 Gb/s data rate. Some of such embodiments further comprise a digital data router or switch having a plurality of receptacles for QSFP-DD optical transceiver modules, the QSFP-DD optical transceiver module being plugged in one of the receptacles having eight electrical data ports; the digital data router or switch may be configured for parallel data communication with the QSFP-DD optical transceiver module over the eight electrical data ports of the one of the receptacles, at a rate of approximately 10 Gb/s per port and direction.

In some embodiments of any of the above apparatus, the QSFP-DD optical transceiver module is configured for an 8×10 gigabit Ethernet (GbE) break-out.

In some embodiments of any of the above apparatus, the QSFP-DD optical transceiver module is configured to support bidirectional 10 gigabit Ethernet (GbE) communications between each of the more than 4 optical data ports thereof and a corresponding one of the electrical data ports thereof.

According to a related example embodiment disclosed above, e.g., in the summary section and/or in reference to any one or any combination of some or all of FIGS. 1-3, provided is an apparatus (200, FIG. 2; 300, FIG. 3). The apparatus comprises a digital data router or switch (e.g. 200, FIG. 2; 300, FIG. 3) comprising a plurality of receptacles (e.g. 230, FIG. 2; 310, FIG. 3) for QSFP-DD optical modules, one of the receptacles having eight electrical data ports (e.g. $214_1$-$214_8$, FIG. 2). The digital data router or switch is configured for parallel bidirectional data communication with a QSFP-DD optical transceiver module (e.g. 100) plugged into the one of the receptacles (e.g. 230) over at least five of the eight electrical data ports at a rate of approximately 10 Gb/s per port. According to some embodiments, the apparatus comprises a dedicated clock recovery circuit (e.g. $244_1$, $244_8$, FIG. 2) for each of the at least five electrical data ports, each of the dedicated clock recovery circuits configured for approximately 10 Gb/s signal bit rate. According to some of such embodiments, the apparatus comprises a dedicated clock recovery circuit (e.g. $244_1$-$244_8$) for each of the eight electrical data ports, each of the dedicated clock recovery circuits configured for approximately 10 Gb/s signal bit rate.

The above described examples of the pluggable optical transceiver module for N×10 Gb/s bidirectional ports at each of the optical and electrical interfaces thereof, where N>4, and of the digital data router configured for such pluggable modules, are not intended to be limiting, and many variations will become apparent to a skilled reader having the benefit of the present disclosure.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims. Various features described above with reference to a specific embodiment or embodiments may be combined with other embodiments.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Furthermore in the description above, for purposes of explanation and not limitation, specific details are set forth such as particular architectures, interfaces, techniques, etc. in order to provide a thorough understanding of the present invention. In some instances, detailed descriptions of well-known devices, circuits, and methods are omitted so as not to obscure the description of the present invention with unnecessary detail. Thus, for example, it will be appreciated by those skilled in the art that block diagrams herein can represent conceptual views of illustrative circuitry embodying the principles of the technology. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, while the present invention has been particularly shown and described with reference to example embodiments as illustrated in the drawing, it will be understood by one skilled in the art that various changes in detail may be affected therein without departing from the spirit and scope of the invention as defined by the claims.

We claim:

1. An apparatus comprising:
   a Quad Small Form-Factor Pluggable Double Density (QSFP-DD) optical transceiver module comprising more than four optical data ports and more than four electrical data ports;
   wherein the QSFP-DD optical transceiver module is configured for approximately 10 giga-bit-per-second (Gb/s) bidirectional data communication on each of the data ports; and
   wherein the QSFP-DD optical transceiver module is configured to communicatively inter-connect each of the optical data ports thereof to a corresponding one of the electrical data ports thereof.

2. The apparatus of claim 1, wherein the QSFP-DD optical transceiver module is configured to inter-connect each of the optical data ports thereof to the corresponding one of the electrical data ports thereof at an approximately 10 Gb/s data rate.

3. The apparatus of claim 2, wherein each of said optical and electrical data ports is full-duplex.

4. The apparatus of claim 3, wherein the QSFP-DD optical transceiver module is absent of CDR circuitry.

5. The apparatus of claim 3, wherein the QSFP-DD optical transceiver module is configured to communicate data between pairs of corresponding electrical and optical data ports of the module without mixing therein of data from another of the pairs of corresponding electrical and optical data ports of the module.

6. The apparatus of claim 2, further comprising a digital data router or switch having a plurality of receptacles for QSFP-DD modules, the QSFP-DD optical transceiver module being plugged into one of the receptacles having more than four electrical data ports;
   wherein the digital data router or switch is configured for parallel data communication with the QSFP-DD optical transceiver module over the more than four electrical data ports of the one of the receptacles at a rate of approximately 10 Gb/s per port.

7. The apparatus of claim 6, wherein the digital data router or switch is configured to provide clock recovery at approximately 10 Gb/s bit rate for data signals received from each of the more than four electrical data ports of the one of the receptacles thereof.

8. The apparatus of claim 6, wherein the QSFP-DD optical transceiver module comprises more than four separate bidirectional data links pair-wise interconnecting the electrical and optical data ports thereof, each of the separate bidirectional data links comprising an electrical-to-optical converter configured for approximately 10 Gb/s operation.

9. The apparatus of claim 8, wherein each of the separate bidirectional data links further comprises an optical-to-electrical converter configured for approximately 10 Gb/s operation.

10. The apparatus of claim 2, wherein the QSFP-DD optical transceiver module has, at least, six of the optical data ports and at least six of the electrical data ports, each of said at least six of the optical data ports and said at least six of the electrical data ports being configured for full-duplex operation at an approximately 10 Gb/s data rate.

11. The apparatus of claim 10 further comprising a digital data router or switch having a plurality of receptacles for QSFP-DD modules, the QSFP-DD optical transceiver module being plugged into one of the receptacles having more than six electrical data ports; and
   wherein the digital data router or switch is configured for parallel data communication with the QSFP-DD optical transceiver module over the more than six electrical data ports of the one of the receptacles, at a rate of approximately 10 Gb/s per port in each direction.

12. The apparatus of claim 2, wherein the QSFP-DD optical transceiver module has eight of the optical data ports and eight of the electrical data ports, each of said eight of the electrical ports being configured for full-duplex operation at approximately 10 Gb/s data rate.

13. The apparatus of claim 12, further comprising a digital data router or switch having a plurality of receptacles for QSFP-DD modules, the QSFP-DD optical transceiver module being plugged into one of the receptacles having eight electrical data ports, wherein the digital data router or switch is configured for parallel data communication with the QSFP-DD optical transceiver module over the eight electrical data ports of the one of the receptacles at a rate of approximately 10 Gb/s per port.

14. The apparatus of claim 12, wherein the QSFP-DD optical transceiver module is configured for an 8×10 gigabit Ethernet (GbE) break-out.

15. The apparatus of claim 2, wherein the QSFP-DD optical transceiver module is configured to support bidirectional 10 gigabit Ethernet (GbE) communications between each of the more than 4 optical data ports thereof and a corresponding one of the electrical data ports thereof.

16. The apparatus of claim 13, wherein the digital data router or switch is configured for 10 gigabit Ethernet (GbE) communications on each of the eight electrical data ports of the one of the receptacles.

\* \* \* \* \*